United States Patent [19]

Spross et al.

[11] Patent Number: 5,451,779
[45] Date of Patent: Sep. 19, 1995

[54] FORMATION DENSITY MEASUREMENT APPARATUS AND METHOD

[75] Inventors: Ronald L. Spross; Thomas Burnett, both of Humble, Tex.

[73] Assignee: Baroid Corporation, Houston, Tex.

[21] Appl. No.: 167,672

[22] Filed: Dec. 15, 1993

[51] Int. Cl.$^6$ .............................................. G01V 5/12
[52] U.S. Cl. .................................. 250/266; 250/254; 250/269.1; 250/269.3; 250/269.8
[58] Field of Search .................... 250/254, 256, 269.1, 250/269.3, 269.6, 269.7, 269.8, 265, 266

[56] References Cited

U.S. PATENT DOCUMENTS

| | | |
|---|---|---|
| 3,321,627 | 5/1967 | Tittle . |
| 4,048,495 | 9/1977 | Ellis ..................................... 250/264 |
| 4,661,700 | 4/1987 | Holenka ......................... 250/256 X |
| 4,814,609 | 3/1989 | Wraight et al. ..................... 250/254 |
| 4,864,129 | 9/1989 | Paske et al. ..................... 250/254 X |
| 5,017,778 | 5/1991 | Wraight . |
| 5,091,644 | 2/1992 | Minette . |
| 5,120,963 | 6/1992 | Robinson et al. . |
| 5,130,950 | 7/1992 | Orban et al. ..................... 250/254 X |
| 5,250,806 | 10/1993 | Rhein-Knudsen et al. ......... 250/254 |

FOREIGN PATENT DOCUMENTS 2252623 8/1992 United Kingdom ............... 250/254

Primary Examiner—Carolyn E. Fields
Assistant Examiner—Edward J. Glick
Attorney, Agent, or Firm—Browning, Bushman, Anderson & Brookhart

[57] ABSTRACT

A method and apparatus for determining at least one characteristic of a formation is provided which includes storing a plurality of counts received from both a long space radiation detector and a short space radiation detector. The counts are detected during a plurality of short duration time periods which are brief compared to rotary drilling speed. A count rate mean is determined and used to sort each of the plurality of count measurements into one of at least three bins. Count information accumulated in at least one of the bins is used to calculate a corrected density. A short space collimator enhances the count rate of singly scattered gamma rays detected by the short space detector and blocks gamma rays from the formation radially outwardly of the short space detector to improve spine-rib correction characteristics for relatively short standoffs. The method of sorting the plurality of short duration time period measurements improves the accuracy for short standoffs to larger standoffs.

43 Claims, 6 Drawing Sheets

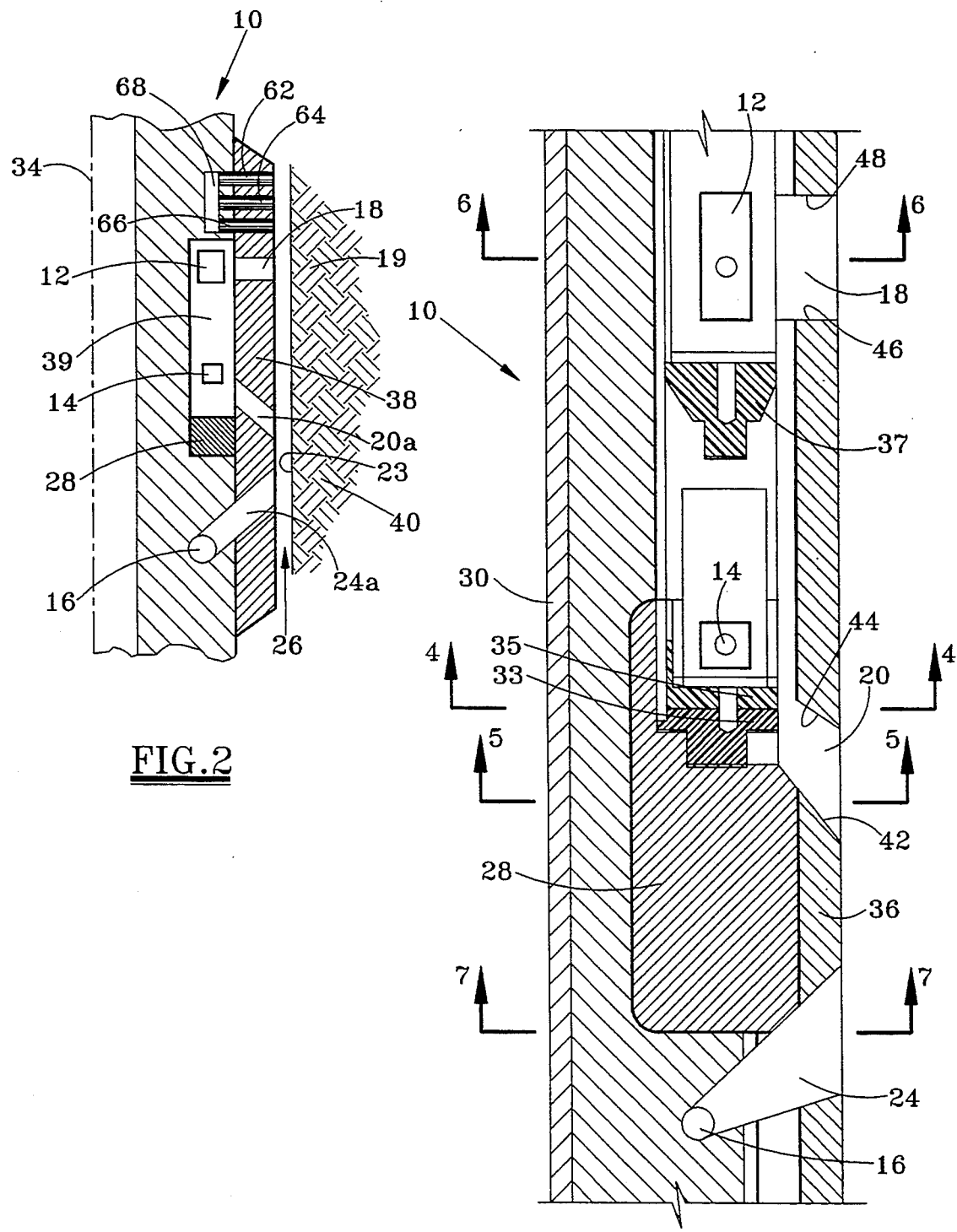

FORMATION DENSITY MEASUREMENT APPARATUS AND METHOD

1. FIELD OF THE INVENTION

The present invention relates to apparatus and methods for measuring radioactive emissions in an earth borehole environment. More particularly, the present invention relates to a downhole tool and method for improving accuracy of such measurements, and particularly formation density measurements.

2. BACKGROUND OF THE INVENTION

Formation density measurements are typically used to calculate formation porosity. Using the formation porosity and other measured values, e.g., formation resistivity, an oil or gas well may be evaluated. Furthermore, porosity information concerning a reservoir permits the estimation of other useful determinations, such as the number of recoverable barrels of oil. With such information, accurate decisions by the oil recovery operator may be made concerning the development or production of the reservoir.

Density logging is based on the detection of attenuated gamma rays emitted from a radioactive source. After gamma rays from the source penetrate the borehole and formation, a fraction of the scattered gamma rays are counted by the gamma ray detectors. The scattering which the gamma rays experience after emission from the source and prior to detection is related to formation bulk density. More specifically, the number of gamma rays so scattered is exponentially related to the formation electron density. Since nuclear emission from a radioactive source is random but probabilistic in occurrence, the average count rate must be taken over a period of time long enough to obtain a number of counts sufficient for a statistically accurate count rate measurement.

Formation density measurements made during wireline logging operations by pulling a density tool through a borehole via an electric wireline have been available for decades. In these operations, a density tool which contains a radioactive gamma ray source and typically two gamma ray detectors may be decentralized in the borehole so the detectors directly engage the borehole wall. If the detectors are offset from the borewall, the drilling mud has a severe perturbative effect on the measurement. Typically, a backup arm or spring applies a decentralizing force to the tool for this purpose. To get an accurate measurement, the decentralized logging tool is preferably pulled through the borehole at a speed low enough to allow compensation for count rate statistics, e.g., 0.5 ft/sec.

Despite the decentralizing force, the tool may be displaced from the borewall by a mud cake that often builds up on a permeable formation. To correct for this commonly occurring situation, count rate measurements from the detector closest to the source (the short space detector) and from the furthest detector (the long space detector) are combined to provide a more accurate reading. For this purpose, a spine and rib plot may be used which plots long space and short space count rates against each other for different calibration materials and for different stand-offs between the detectors and the formation.

More recently, measurement while drilling (MWD) tools have been used for making formation density measurements. Density tool electronics and the gamma detectors (both the short space and long space detector) may be disposed in a stabilizer blade affixed to a drill collar in a lower portion of the drill string near the drill bit. The stabilizer blade displaces drilling mud in the annulus of the borehole and places low density windows, installed radially outward of the radiation source and detectors, in contact with the earth formation. During rotary drilling, the MWD tool may typically rotate at a rate of as much as one or two revolutions per second. To account for statistics, data sampling times in the MWD tool are longer than those used with wireline density tools, and are typically in the range of about 30 seconds.

While drilling, contact of the stabilizer blade with the borehole wall may be lost. If the borehole stabilizer blades are the same diameter as the well bore, then wall contact can be assumed to be constant during the 30 second sampling time period. However, it is well known that boreholes are often significantly larger than bit size, and that this enlargement may occur simultaneous with or very soon after passage of the drill bit. This loss of contact affects the density measurement, so that the apparent density detected is greater or less than the true density, depending on the relative densities of the borehole fluid and the formation.

If borehole enlargement has occurred by the time the MWD tool logs the hole, then a measurement taken over a period of 30 seconds can generally be expected to include data from all possible offset distances of the stabilizer blade from the borehole wall. This introduces error into the typical compensation technique which compares the computed density response of the short and long spaced detectors. During the sampling period, count rates are accumulated in a linear fashion for the various borehole offsets experienced during the measurement. However, the response of the tool to the offset distance between the borehole wall and the tool sensors is logarithmic. Therefore, the compensated response of the tool to borehole enlargement will be progressively in error as the borehole size increases. Various methods have been developed which attempt to address these problems.

U.S. Pat. No. 5,017,778 to P. D. Wraight discloses a method and apparatus for determining the mean of successive measurements preferably taken at least twice as fast as drilling RPM, as well as the standard deviation of the successive measurements. These computations are combined for providing output signals in accord with variations in the transverse cross-sectional configuration of the borehole, and provide indications representative of the desired formation characteristic as well as the borehole configuration. This method relies on the theoretical relationship between the mean and the standard deviation under circumstances where there is constant tool contact with the borehole wall. Under these circumstances, the theoretical value of the standard deviation will be substantially the same as the measured standard deviation. However, if the hole is large in diameter such that tool contact with the borehole wall varies, the relationship between tool offset and count rates causes a divergence between the measured standard deviation and its theoretical value. A correction is applied to the mean count rate based on the difference between the measured and theoretical standard deviations.

Because the correction applied to the mean is derived from the standard deviation of the successive measurements, the accuracy of the method depends on the symmetry of the actual distribution of the samples about the mean. To the extent the actual distribution is skewed about the mean, the accuracy of the correction will deteriorate. There are several factors which tend to make the count rate distribution asymmetric about the mean. For instance, it is not uncommon for stable, dynamic situations to be set up for a wide range of combinations of RPM and weight-on-bit, where the tool axis itself will be moving. This movement is often in the form of a repeatable pattern in the hole, and may significantly affect the distribution of successive measurements about the mean. In such a case, depending on the type and extent of "whirling" or movement of the tool axis itself, it is conceivable that the complete circumference of the borehole may not even be scanned at least once during a total sampling period, as required by the Wraight method to assure that meaningful output data is obtained. It is currently difficult to control these situations in real time without the presence of additional downhole sensors, because their occurrence may not be detectable by surface measurements.

Another factor which may cause a skewed distribution of data involves the fact that the effect of density on gamma ray count rate is highly non-linear. For instance, if the tool remains on the "low" side of an elliptical hole, the tool will contact the bore wall for a longer period of time than if the tool remains on the "low" side of a circular hole. Due to the highly non-linear effect on count rate, the distribution of the successive measurements will be skewed.

U.S. Pat. No. 5,091,644 to D. C. Minette discloses a method for analyzing data from a measurement-while-drilling formation evaluation tool to compensate for rotation of the logging tool. The received signal is broken down, preferably into four sections. As the tool rotates, the detectors quickly pass through these four quadrants. Each time they pass a boundary, a counter is incremented, pointing to the next quadrant. Thus, the data is divided into four spectra each obtained for one-fourth of the total acquisition time. To determine the sector in which the tool is operating, the output from a supplementary sensor is used, such as an inclinometer or a magnetometer. Minette also states that an acoustic borehole caliper may be used to divide the borehole into these sections (e.g. quadrants) based on standoff in those sections.

If the tool is centered in a perfectly circular hole, the offset the tool experiences while in each sector will be the same and the number of counts accumulated in each sector will be the same. However, if the tool axis is not aligned with the bore hole axis, this will not be true, and the offset will be different for different sectors. The counts accumulated in each sector will thus be different, with the counts in the sector or sectors corresponding to the minimum offset value being those of highest quality for determination of the formation density.

Like the Wraight description, there is an implicit assumption in the Minette technique that the axis of the tool remains in a fixed orientation in the hole during the measurement. There is, however, no easy and reliable mechanism to keep the tool axis at a fixed location in the borehole. It is thus highly probable that movement of the tool axis about the bore hole will occur in a vertical or near vertical hole. The possibility of such movement never completely disappears, even in a highly deviated hole. Moreover, due to the location of the density sensors in a blade portion of the tool, there may be an increased likelihood of such movement of the tool axis as the blade engages the borehole wall.

Because the sectors or quadrants are assumed to be fixed in the hole, the consequence of axial movement or translation is that there will be less than optimum correlation, or possibly no correlation at all, between sectors that are anticipated to be consistent and tool offset. While use of an acoustic caliper signal to sort the signal into bins based on averaged strand-off may alleviate the problem to some extent, there is still a problem of storing data for the correct quadrant when it is assumed the sectors will arrive consistently and sequentially. During movement of tool axis, the same tool position associated with sectors and quadrants will not necessarily occur consistently and sequentially. Thus, if there is no override to the sequential storing of data, data may be skewed when the tool axis is not fixed, even when using an acoustic caliper sorting signal.

In another method directed to wireline logging with a single detector density tool, U.S. Pat. No. 3,321,627 to C. W. Tittle discloses a collimated source and detector arrangement for a single detector density tool. The collimation concept disclosed in this patent prevents the measurement from being influenced by borehole fluids by collimating the source and detector so that gamma rays are more likely to be directed into the formation. The tool has a source collimator for directing a small solid angle beam of gamma-rays into the material undergoing the density determination. The tool also has a detector collimator for limiting the access of gamma-rays to the gamma-ray detector to those gamma-rays that scatter and travel within a small solid angle that intersect within the formation with the small solid angle beam of gamma-rays from the source. A 1985 Hearst and Nelson article entitled *Well Logging for Physical Properties* discusses the related concepts of density measurements, and especially single scattering density measurements.

There remains the need for an improved method and apparatus to more accurately measure radiation in a well bore environment that overcomes the problems encountered by prior art tools taking such measurements, including poor accuracy for readings taken at varying standoffs from a borehole wall. Those skilled in the art have long sought and will appreciate the present invention, which provides solutions that substantially alleviate these and other problems.

SUMMARY OF THE INVENTION

The present invention provides a method for determining at least one characteristic of an earth formation penetrated by a borehole with a longitudinal axis. A first directional radiation sensor is disposed in the borehole adjacent the earth formation for detecting counts indicative of radiation received from the earth formation. The detector may be of a type which is sensitive to various types of radiations or emissions, including gamma rays and/or neutrons, and to various energy ranges or those radiations or emissions. The first directional radiation sensor is rotated at a rotational speed having a single rotation time period, and the detected counts are stored during the rotation for a total sample period. The phrase "single rotational period" as used herein is not intended to mean that the drill string speed is constant, but rather is intended to mean the rotational time period for one rotation of the tool in the borehole. This single or one rotation may, however, be considered constant with respect to the sampling periods occurring during that one rotation of the tool. The total sample period is longer than two times the single rotation time period. The step of storing counts includes storing counts for each of a series of short duration measurements taken during the total sample period. Each of the short duration measurements are taken for a short time segment. The short time segment is shorter than one-half, and preferably is shorter than one-fourth, of the single rotation time period. A plurality or bins are defined as a function of at least a portion of a count rate distribution of said counts detected during each of said short duration time periods. Preferably, the stored counts are retrieved and a count mean of the total sample period is determined from the counts detected during the series of short duration measurements. Each of the short duration measurements is then sorted in one of preferably at least three bins, with each bin having limits defined as a function of the count rate mean value, for providing an indication accurately representative of the characteristic of the earth formation being measured.

The method preferably includes positioning a radiation source in the borehole and positioning a first directional sensor axially closer to the radiation source than a second directional radiation sensor. Radiation detected by the first directional sensor is blocked so as to substantially prevent radiation from the earth formation from being received by the first directional sensor from a radial direction substantially normal to the longitudinal axis of the borehole.

The apparatus of the present invention includes a short space detector and a long space detector for investigating properties of earth formations surrounding a borehole irradiated with radiation from a radiation source. The tool preferably includes a substantially tubular body having a longitudinal axis substantially co-axial with the borehole. A short space detector collimator is disposed within the tubular body at a first spaced position from the radiation source, and is filled with a material substantially transparent to the radiation. The short space detector collimator has a short space cross-section defined by a plane intersecting the collimator, and parallel to and including the longitudinal axis, with a first side of the short space cross-section spaced farthest from the radiation source being oriented to form a first acute angle with respect to the longitudinal axis, thereby limiting radiation received by the short space detector in a direction substantially normal to the longitudinal tool axis. A long space detector collimator is disposed within the tubular body at a second spaced position from the radiation source. The long space detector collimator is substantially formed with material substantially transparent to the radiation. The long space detector collimator has a wall extending radially outwardly from the long space detector to pass radiation in a direction substantially normal to the longitudinal tool axis.

The method includes providing an irregular borehole flag for determining when corrections for irregular hole size should be made. For this purpose, stored counts are retrieved and a total count rate mean and the measured standard deviation of the counts are determined for counts detected during each of a series of short duration measurements. The total count rate measured standard deviation is compared with a theoretical standard deviation computed from the total count rate mean, and an irregular borehole flag signal is produced when the total count rate measured standard deviation differs from the calculated standard deviation by more than a specified. The correction itself is, however, not determined by the measured standard deviation.

An alternative embodiment of the invention provides for positioning an acoustic borehole caliper in the borehole in alignment with the first directional radiation sensor for receiving acoustic signals functionally related to an offset of the first directional radiation sensor from the earth formation in the borehole. A series of short time duration measurements are taken, and each of these measurements are sorted into at least two bins. The bin limits are determined by the offset detected by the caliper without regard to the order in which the series of measurements was made. Data in at least one of the plurality of bins is saved.

Preferably, the method of the present invention includes forming the short space collimator for passing a portion the gamma rays into the short space detector such that a first azimuthal width of a portion of the short space collimator is less than approximately 4% of the tool diameter of said tool housing. The long space collimator is preferably configured to have an azimuthal width greater than at least three times the first azimuthal width of the portion of the short space collimator.

An object of the present invention is to provide an improved method of determining porosity by correction of radiation counts detected by borehole tools.

Another object of the invention is to extend the standoff range for which a corrected density is reasonably accurate.

A feature of the present invention is a method for sorting counts detected during short measurements based on the mean of the short measurements taken during a much longer sample time.

Another feature of the invention is a detector collimator to obtain more accurate spine and rib correction information for formation density tools.

An advantage of the present invention is that a method for correcting radiation count information is effective regardless of movement of the measurement tool axis during drilling.

Another advantage of the invention is a method for correcting radiation count information that is effective even though response from the formation to the detectors changes logarithmically.

Other features and intended advantages of the present invention will be more readily apparent by reference to the following detailed description in connection with the accompanying drawings.

BRIEF DESCRIPTION OF THE DRAWINGS

FIG. 2 is an elevational view, in cross-section, showing a collimator scheme in accord with the present invention;

FIG. 3 is an elevational view, in cross-section, showing another embodiment of a collimator scheme in accord with the present invention;

While the present invention will be described in connection with presently preferred embodiments, it should be understood that it is not intended to limit the invention to those embodiments. On the contrary, it is intended to cover all alternatives, modifications, and equivalents included within the spirit of the invention and as defined in the appended claims.

DETAILED DESCRIPTION OF PREFERRED EMBODIMENTS

The present invention provides an improved method and apparatus for determining at least one characteristic of an earth formation penetrated by a borehole, and more particularly includes techniques and equipment capable of generating accurate radiation measurements indicative of the formation density. Density measurement taken by measurement-while-drilling (MWD) techniques may be corrected to produce more reliable information to a drilling operator.

Figure 1:
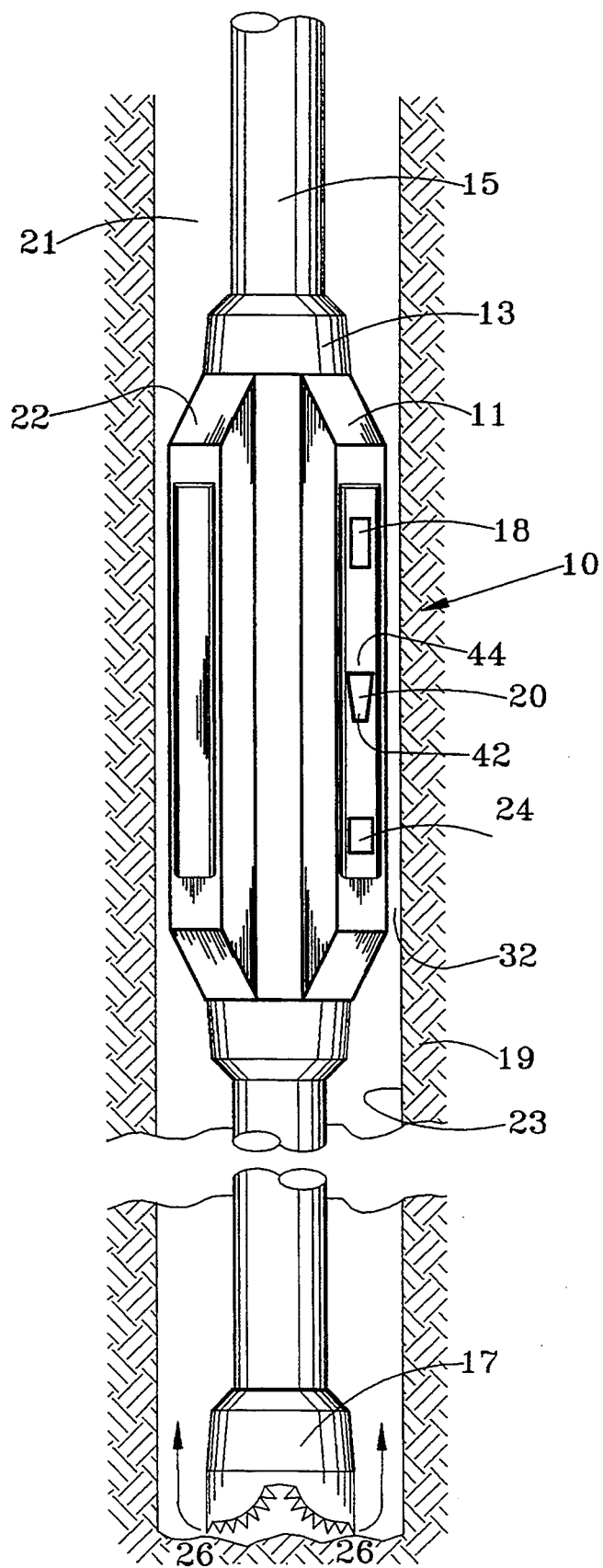
FIG. 1 is an elevational view of a measurement-while-drilling tool in accord with the present invention within a borehole.

Referring now to the drawings and more specifically to FIGS. 1-3, a tool or apparatus 10 is shown for measuring formation density. Both a radiation source and a pair of detectors are preferably disposed within blade 11 of drilling collar 13 which is normally a tubular body. Drilling collar 13 is typically threadably secured to drill string 15, which may be rotated to turn bit 17 in a conventional manner for drilling through earth formation 19 and thereby borehole 21 having borehole wall 23. Drill collar 13 preferably includes two or more additional blades, such as blade 22. Drill collar 13 could be located at various places in drill string 15, but is preferably located near bit 17 to provide measurements taken as close as reasonably to the portion of the borehole 21 immediately above the bit.

Apparatus 10 includes long space (far) detector 12, short space (near) detector 14, and radiation source 16, each generally shown in FIG. 2 and FIG. 3. Radiation source 16 is preferably a Cesium-137 type source. A long space collimator 18, a short space collimator 20, and a source collimator 24 as shown in outline in FIG. 1 are disposed radially outwardly of detectors and source 12, 14, and 16, respectively, as discussed in greater detail hereafter. Items such as shield 28, sleeve shaped borehole liner 30, and outer liner 36, may be formed of a high density material, such as lead or tungsten, to prevent gamma rays from traveling from source 16 to the detectors 12 or 14 except as intended. Cushioning material at 33, 35, and 37 as shown in FIG. 3 and in other positions may be used to protect the detectors from excessive vibration. Electronics package 39 as generally shown in FIG. 2 may include memory, voltage supplies, regulators, transmission circuitry, and other components for operation of the tool 10, as explained subsequently.

The primary density sensor in a preferred embodiment of apparatus 10 is long space detector 12. For long space detector 12, the count rate received from earth formation 19 when irradiated with gamma rays by source 16 changes logarithmically with the electron density of earth formation 19. However, if apparatus 10 is not against borehole wall 23, the offset or annular gap 32 is filled with an intervening borehole fluid 26, which affects gamma rays received by detector 12, and thus the density measurements. This results in an apparent density that is greater or less than the true density, depending on the relative densities of the borehole fluid and formation.

For purposes of providing a standoff correction, a short spaced detector 14 is preferably utilized. With the shorter spacing and other factors, as discussed hereafter, a greater sensitivity to the width of the gap 32 (also called the tool standoff) is obtained than with using only long space detector 12. The long space 12 and short space detector 14 are preferably calibrated such that they both read the same apparent density if the standoff is zero, i.e., no gap 32. However, as the standoff increases from zero, the differing responses of the two detectors to intervening borehole fluid results in different apparent densities being detected by the two detectors.

Figure 8:
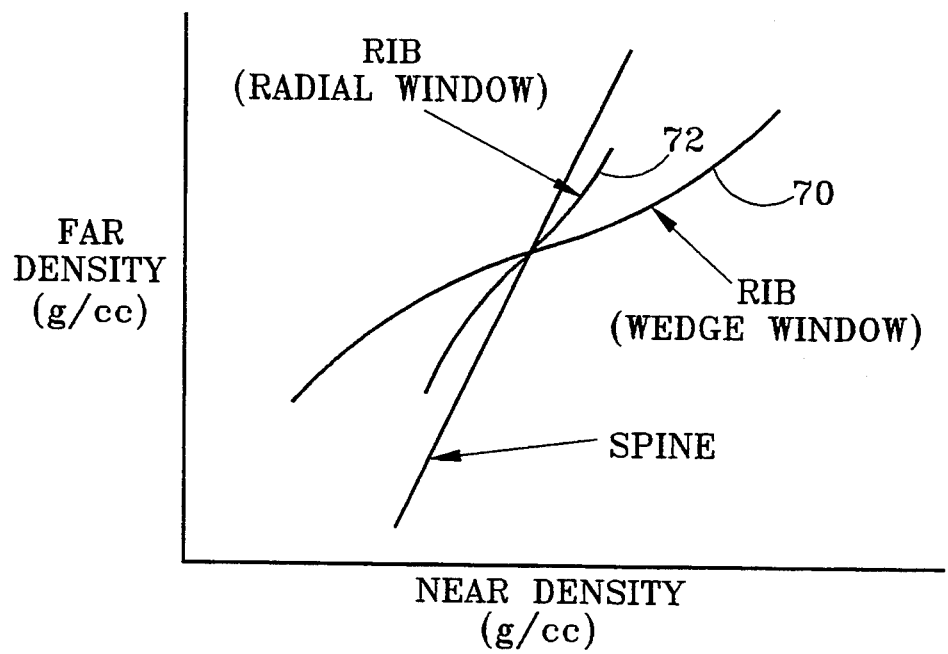
FIG. 8 is a spine-fib plot in accord with the present invention.
Figure 9:
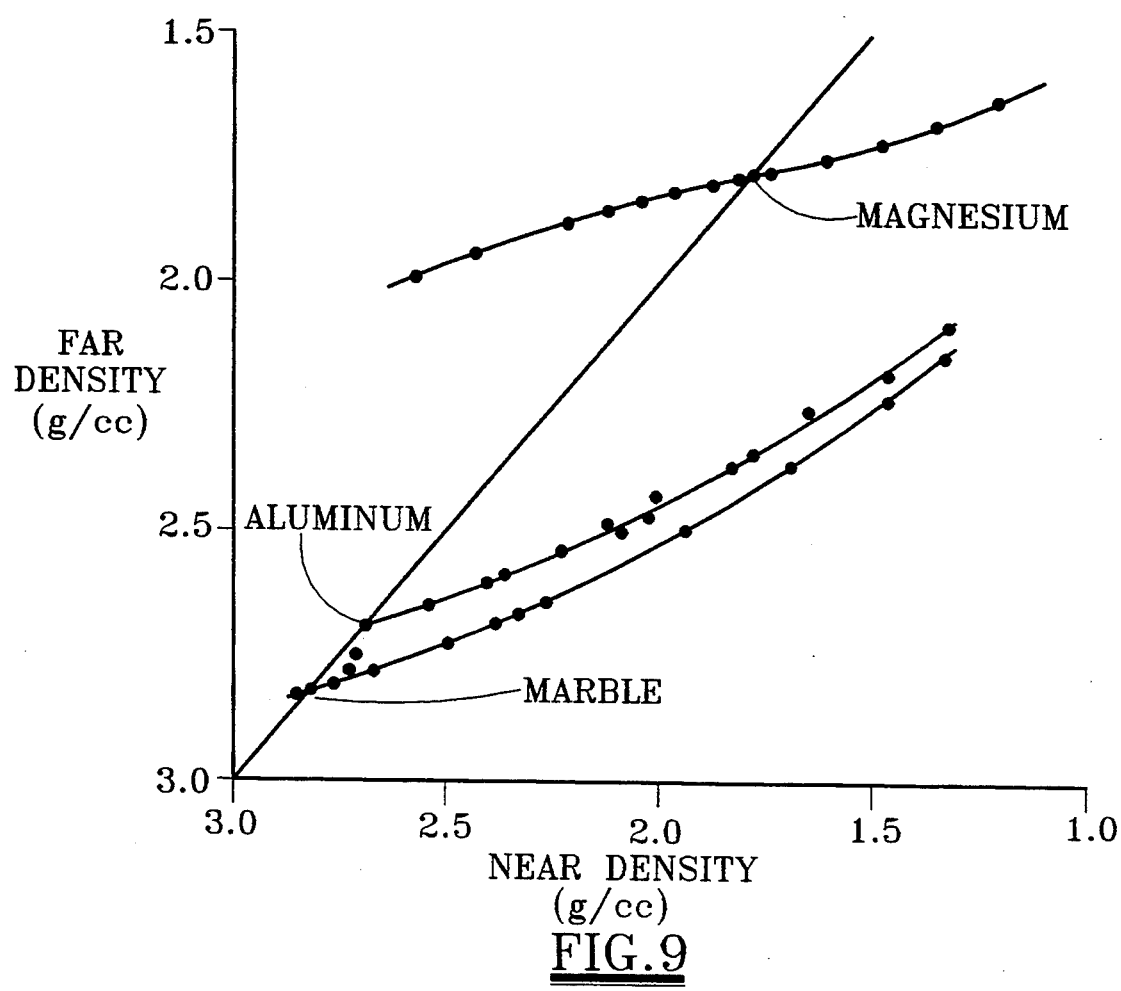
FIG. 9 is another spine-rib plot in accord with the present invention.

The behavior of the two detectors with standoff is often depicted as a spine and rib plot, as shown in FIGS. 8 and 9. This plot essentially depicts the long space detector 12 response plotted against the short space detector 14 response for various materials, standoffs, and borehole fluid densities. FIG. 8 generally indicates the spine and the rib lines defined by responses of the near (short) and the (long) detectors. FIG. 9 shows tool response for different materials with different standoffs. While FIG. 9 shows apparent near detector 14 density plotted with respect to apparent far detector 12 density, this plot could also depict near density detector 14 count rates versus far detector 12 count rates. Corrected density readings can be obtained in a manner well known in the art by finding a point on a rib, or on an interpolated rib, defined by the response of the two detectors, and following the rib back to the spine, which is normally calibrated with a scale (not shown) to indicate the corrected density. As stand-off increases, the plot of the rib eventually circles back to the spine, whereupon both detectors read the same density, which is the correct density of the borehole fluid.

Figure 10:
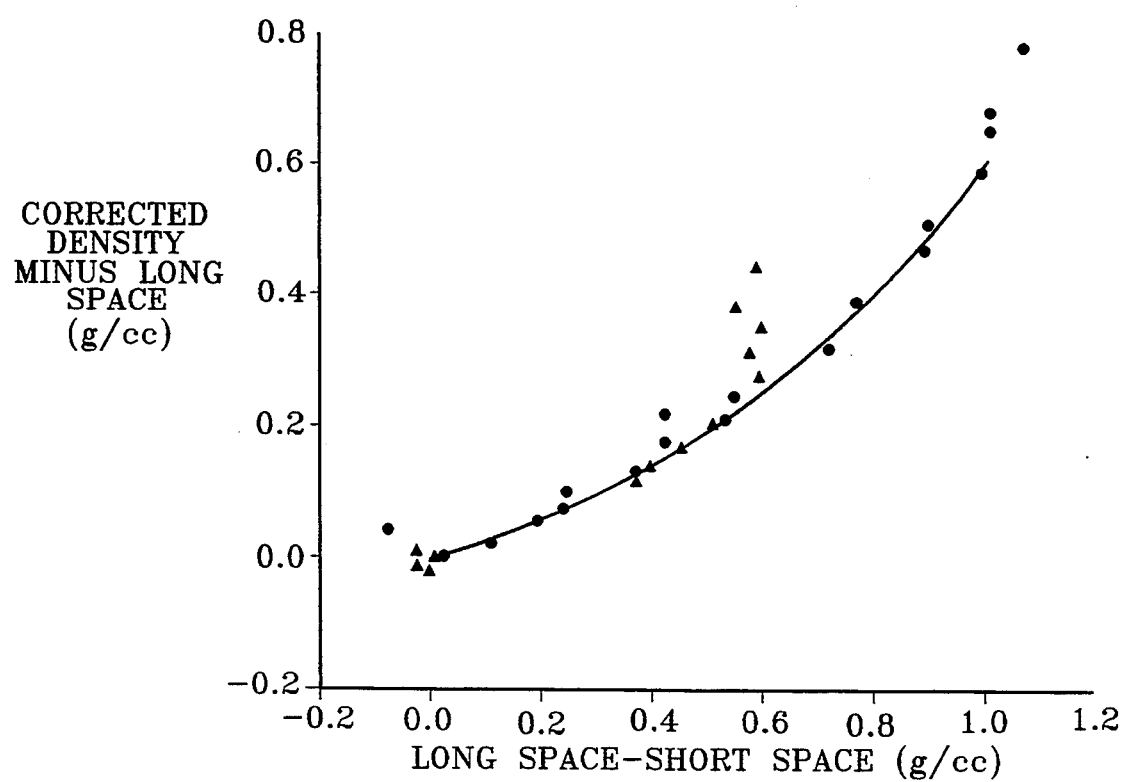
FIG. 10 is a density correction curve plot in accord with the present invention.

FIG. 10, which is derived from spine and rib plots, may be conveniently used to provide a correction by plotting on the vertical scale the difference between the corrected or true density and long space detector 12 density (i.e. the standoff correction). On the other horizontal scale, the difference in densities detected by long space detector 12 and short space detector 14 is plotted. For a preferred embodiment of the present invention, the behavior of the standoff correction is such that the correction may be described by a polynomial function of a single variable (the difference in the near and far apparent densities) for standoffs up to about 2.5 centimeters and for mud weights up to approximately 2.0 kilograms/liter.

At standoffs of greater than 2.5 centimeters, the short space detector 14 begins to saturate, seeing (sensing gamma rays responsive to) only mud. The accuracy of the detection measurement at less than 2.5 centimeters depends on various factors, such as the collimators which improve tool response for standoffs of less than 2.5 centimeters. The method of the present invention is used to provide a flag for the situation of extremely large standoffs, where the spine-rib correction technique deteriorates, yet also provides an improved method for extending the standoff range in which corrected density is reasonably accurate. In addition, an acoustic caliper may be used for various purposes, such as borehole size checks prior to running casing, and determining the borehole volume and thus the amount of cement needed to cement the casing in place. Thus, while the apparatus of the present invention provides a more accurate standoff correction between zero and 2.5 centimeters, the method of the present invention effectively extends the standoff range in which the density reading may be accurately corrected.

Using the flag of the present invention, it is thus possible to determine whether to use the correction method of the present invention, as discussed hereinafter. Preferably, spine and rib derived correction plots generated from sample data collected over long time periods will be used, unless sample data needs to be otherwise corrected due to borehole enlargement resulting in a standoff of more than about 2.5 centimeters. The flag of the present invention provides a convenient method for detecting when such correction is desirable.

If enlargement of borehole 21 has occurred when the apparatus or tool 10 measures the apparent density of formation 19, then, in general, a measurement taken over a period of 30 seconds (typically a time period which includes many rotations of drill string 15) may be expected to include data from considerably varying offset distances of the stabilizer blade 11 spaced from borehole wall 23. This varying offset introduces error into spine-fib based compensation schemes or other conventional schemes, that compare the computed density response of the two detectors, since these schemes are based on isolated responses of the two detectors to static situations. During the sampling period, counts are being integrated or accumulated in a linear fashion for the various borehole offsets 26 experienced during measurement. Thus the count rate response for apparatus 10 for a large number of static, possibly random, measurements will be combined linearly. However, as discussed above, the response of the tool 10 to the standoff from the earth formation 19 is logarithmic. Without correction other than spine-rib type correction, the compensated response of tool 10 will thus be progressively in error as the borehole 21 size relative to the outer effective diameter of the tool 10 increases. While it is possible for the tool to accurately correct for some degree of excessive borehole size, the hole may attain a diameter for which a spine-rib correction of averaged readings will break down.

Rapid sampling is therefore used in the method of the present invention to shorten the sample period to the point where the rapid sample is much shorter than the single rotation period of tool 10 or drill string 15. The shorter sample period then includes data over a much smaller range of standoffs (i.e., data taken from only a portion of the rotation of tool 10), and will as a consequence more accurately follow a correct rib on a spine and rib chart. Because of the shortness of the sampling periods, however, the statistical noise in the data will be significantly enhanced, and thus the accuracy of the correction based on the spine and rib chart will be compromised by statistical noise. Even with the statistical noise for sampling intervals as short as 50 or 100 milliseconds, the variation in count rates between zero standoff and large standoffs (e.g., standoffs in excess of about 2.5 centimeters for which spine-rib correction breaks down) is high enough so that these situations can be distinguished. Since during a single rotation of tool 10 the formation density does not change significantly, any statistically significant change in the count rate (that is, a change that is greater than the ordinary variation attributable to the random nature of nuclear events) may be attributed to a variation of the standoff between the tool 10 and the formation 19.

For a gauge hole size, the tool will always be in contact with the borehole wall. In this case, the only variation in the counts in a given sample period will be due to recognized nuclear counting variations, which follow Poisson statistics. For a larger hole size, different short samples will correspond to different standoff values and the variation of counts therefore will have an additional component attributable to the changing standoff. The distribution of counts for a series of samples extending over several rotations of the tool 10 may thus be compared to the Poisson distribution that would be expected for a gauge borehole. Any statistically significant difference in the two distributions will imply an enlarged borehole. It is then possible to examine the sample data from individual short periods and give a lower weighting to or discard (in which case the weighting is zero) those sample periods that have too high a count rate (in the typical case of mud being less dense than the formation) or too low a count rate (in the case of relatively heavy muds). Sample periods with excessively low or excessively high count rates samples will be those periods producing sample data lying off the proper rib. Consequently, the average of the remaining rapid samples will lie more closely to the proper rib or the plot.

A total sample period is taken which typically has a duration on the order of about 20 or 30 seconds, and therefore includes a time period typically much larger than two times a single rotation of the tool 10. The total sample period of 30 seconds may thus be divided into a series of rapid samples or short duration time period measurements of 50 milliseconds. These short sampling periods are preferably consecutive, with each period having a duration of a fraction of a second. An integral number of consecutive short duration time period samples will thus normally constitute a total sample period. In one embodiment of the present invention, the number of samples in a particular short sampling period bin, as discussed hereinafter, may be added to determine whether the total sample period is adequate to sufficiently remove statistical variations.

The duration for a rapid sample or short duration time period measurement should be short enough to obtain samples substantially at the extremes of the range in standoff changes, as well as standoff values between these extremes. The shorter the duration of the sample, the more easily this criterion is met. However, the shorter the duration of the sample, the greater the statistical noise. Fifty milliseconds is a reasonably short time period that can be accomplished for most conditions, although a shorter short duration time period may be used. Thus, the minimum number of rapid samples for a rotation should be about four or five, providing a high probability of at least one sample in each tool rotation being very near or against the borehole wall. Sample lengths of 50 ms would provide 6.7 samples per rotation of the tool at 200 RPM. The short duration measurement will, according to this invention, be shorter than one-half the single rotation time period for the tool.

Preferably data or variables are collected in various energy windows for each detector in a manner known in the art. Among others, these could include a Pe (photoelectric energy) window for the near (short space) detector 14 to be denoted as PeN, a far (long space) Pe window denoted as PeF, a near density window $\rho N$, and a far density window $\rho F$. PeN and PeF are related to gamma rays received with photoelectric gamma ray energy levels. $\rho N$ and $\rho F$ are related to gamma rays detected at Compton scattering gamma ray energy levels. Total counts (TC) may be defined as the sum of the counts in the short space and long space detectors in the energy interval from 50 Kev to 450 Kev. This range of energy may include or substantially include the four windows discussed above.

In one embodiment, a rapid sampling mode collects short duration samples for each of these windows and for TC. If the total sample time (T) is 30 seconds with rapid or short duration samples (N) of 50 milliseconds (t), then $T = N \times t$, where in this case $N = 600$ short duration samples. The short duration samples are stored in memory which is preferably downhole but could be on the surface if tool to surface transmission rates are adequate for this purpose. In another embodiment, complete spectra for each of the 50 ms samples are collected, and window and statistical analysis is completed following completion of N samples.

At the end of 30 seconds, there are five vectors or series of measurements, i.e., PeN, PeF, $\rho N$, $\rho F$, and TC, each including 600 rapid or short duration measurements. An average of the counts per each short duration sample of the TC vector may be calculated according to Equation 1:

$$TC_{Avg} = \frac{1}{N} \sum_{i=0}^{N-1} TC_i \qquad (1)$$

The theoretical standard deviation of $TC_{Avg}$ is computed as follows:

$$\sigma_{Theory} = \sqrt{TC_{Avg}} \qquad (2)$$

The measured actual standard deviation for the TC vector may then be calculated:

$$\sigma_{Actual} = \sqrt{\frac{1}{N-1} \sum_{i=0}^{N-1} (TC_i - TC_{Avg})^2} \qquad (3)$$

To determine the flag discussed above for enlarged boreholes, the ratio of $\sigma_{Actual}$ to $\sigma_{Theory}$ may be considered. This ratio produces a hole size indicator, which indicator will result in a HSI flag when it reaches a certain value, which value depends on the mud weight.

$$HSI = \frac{\sigma_{Actual}}{\sigma_{Theory}} \qquad (4)$$

While the above equations are preferred equations, similar or related equations may also be used. HSI is preferably stored for each long sample of 30 seconds, and may be stored as an 8-bit number representing values from 0 to 12.75 in increments of 0.05.

The TC vector is preferably used to sort each of the other vectors PeN, PeF, $\rho N$, and $\rho F$ into at least three respective bins. Other numbers of bins could be used, but three bins are presently preferred. A bin is simply a classification of data, and is normally a memory area or memory indicator for storage. While bins are normally storage areas, if one group of data is known to be invalid, data from that bin could be placed in a discard bin and discarded rather than stored.

For this purpose, three bins for PeN are designated as PeN1, PeN2, and PeN3. Similarly, three bins are designated for each of the other vectors, i.e., PeF1, PeF2, and PeF3. Bin 1 then includes all short duration samples for which the value of the TC vector for that sample is less than $TC_{Avg}$ minus some number, such as a theoretical or measured standard deviation or some other number based on a type of standard deviation. The presently preferred number for bin 1 is $TC_{Avg} - (\sigma_{Actual})/2.33$. Bin 2 is similarly determined with the presently preferred range of values including those values for which the value of the TC vector is between $TC_{Avg} - (\sigma_{Actual})/2.33$ and $TC_{Avg} + (\sigma_{Actual})/2.33$. Bin 3 includes all values of TC which are greater than $TC_{Avg} + (\sigma_{Actual})/2.33$. Note that the number 2.33 divides a normal, or Gaussian, distribution into three equal parts. Such a consideration may be used in selecting other numbers, whereby a distribution may be divided into five parts. For instance, a theoretical standard deviation may be used to divide the data into five bins.

A number i may be used to reference the short duration samples for each vector. In the above described embodiment, each vector has 600 elements or values, which would be indicated by the appropriate value of i from 1 to 600. The following sorting may be made based upon the value of i for a particular short duration sample. If $TC_i$ is in Bin 1, then $PeN_i$ is accumulated in PeN1, $PeF_i$ is accumulated in PeF1, and so forth for each vector. If $TC_i$ is in Bin 2 or Bin 3, then the short duration value or measurement for that value of i is accumulated in PeN2 or PeN3, PeF2 or PeF3, etc.

Because the count rate must be computed for each of these bins, it is also necessary to tally up or store the number of short duration samples and the time length of each sample accumulated in each bin. Call these N1, N2, and N3. Thus for every $TC_i$ such that $0 < TC_i < TC_{Avg} - \sigma_{Act}/2.33$, N1 is incremented by 1. If $TC_{Avg} - \sigma_{Act}/2.33 < TC_i < TC_{Avg} + \sigma_{Act}/2.33$, N2 is incremented by 1, etc. In downhole memory storage, previously stored counts in each of four windows may go into each of the three bins. To obtain the count rate for each of the bins, the number of samples ultimately accumulated in each bin is also required. If the total number of samples, N, is constant or known elsewhere, it is only necessary to store information in two of the three bins, because the third bin will store be total counts less the counts stored in the other two bins. In other words, that is, it will always be true that $N1 + N2 + N3 = N$. Such additional information could be stored for check purposes, if desired.

Assuming the formation density is higher than the mud density, formation density in the presently preferred embodiment of the invention may be calculated by averaging the count rates for the respective windows or vectors corresponding to Bin 1 and Bin 2. The density is then corrected with a spine-rib plot type correction. It is also possible to determine density based on the count rates in a single bin, such as Bin 1, since the bin 1 measurements will likely be taken during the shortest standoff. A weighting system could also be used for the bins, perhaps based on the difference in densities determined for each bin rather than discarding (or giving zero weighting to) an entire bin of information. If the formation density is less than the mud density, then Bin 3 should be substituted for Bin 3 in the above discussion.

While the presently preferred embodiment uses a count rate mean for defining the bins, other parts of the distribution count be used. Essentially, the bins are defined in terms of the count rate distribution. The means and some form of standard deviation of the count rate distribution is the presently preferred method for defining the bins. Other segments or parts of the count rate distribution could used. For instance, only those measurements in a portion of the count rate distribution having count rates indicative of being taken near the formation could be used. That might be some percentage of the distribution different from the presently preferred division based essentially on the count rate mean as discussed hereinbefore.

To save computer memory, one may choose not to accumulate data for correcting Pe, or the Pe may be computed from only one detector, preferably the far detector. It is possible to allow downhole software to decide when to process the series of short term measurements based on the HSI flag discussed above. With a sufficiently small value of HSI, the sorting process could be avoided, thereby shortening computing time and saving memory.

An alternate method of sorting may involve the use of an acoustic caliper. Items 62, 64, 66, 68 in FIG. 2 diagrammatically represent an acoustic velocity tool, with transmitter 62, receivers 64 and 66, and electronics package 68 adapted to provide acoustic caliper information. In this case, it may be desirable to sort the vectors into bins, as described above. However, accumulation in these bins may be performed, in this case, while the short duration data samples are being taken, rather than after retrieving the data from memory. The placement in the bins is not limited to the sequence in which the short duration samples are taken.

In the simplest embodiment of an acoustic offset measurement, the signal obtained from the acoustic device will be indicative of the round trip travel time of an acoustic pulse between the tool 10 and the borehole wall 23. Other relevant data, such as acoustic velocity in mud, resolution of the acoustic device, the borehole diameter, and the instantaneous position of the tool in the hole may be computed from simultaneous signals from multiple acoustic sensors. The round trip travel time data from the single acoustic device may be divided into appropriate intervals corresponding to offset ranges of interest. Binning may then occur based on the measured round trip time. For example, in water, round trip time for a 0.2 inch (0.508 centimeter) offset would be $7 \times 10^{-6}$ seconds (7 microseconds). Thus the first bin might include all count data for which the acoustic time was seven microseconds or less, corresponding to an offset of between zero and 0.2 inches; the second bin might include all count data for an acoustic time between seven and fourteen microseconds, corresponding to an offset between 0.2 and 0.4 inches, etc. Binning of a preset number of samples may occur as before, or, because sorting occurs as measurements are made, the number of samples in the bins may be monitored to determine whether an adequate number of rapid samples is present to obtain a reading valid to a predetermined statistical accuracy, and the long sampling time period accordingly reduced or extended. The acoustic sensor data could also provide a flag in a similar manner to the HSI flag for determining when data correction is necessary.

One alternative preferred method of using the data in the selected bins, or all data when the hole size is too small to set the flag HSI as discussed, effectively requires linearizing the count rate versus the standoff for both the near and far detectors. As discussed, tool 10 response is logarithmic with respect to standoff. More particularly, the far detector 12 count rate varies exponentially or logarithmically (non-linearly) with standoff. The short spaced detector 14 count rate response, as preferably collimated in a manner to be discussed, varies approximately linearly out to a stand off of about one inch or one and one-half inches (2.5 mm to about 3.8 mm). When both count rates are linearized, the average near count rate will lie on a near counts versus an average standoff curve at the same average standoff as the far detector. In operation, the sum of logarithms of each long space count rate measurement may be averaged. This average is then used with the average short space count rate, which is linear, for producing the corrected density.

The acoustic caliper signal, if calibrated to determine offset distances, may also be used directly rather than indirectly for correction purposes, with the offset distance being used as part of the correction data. Other methods and equipment may also be used to effectively generate on instantaneous value of borehole offset.

While a correction method has been discussed which extends the range of tool accuracy as standoffs become relatively large, it is also desirable to increase the accuracy of corrections for smaller standoffs, i.e., for standoffs of less than about 2.5 centimeters. Thus, the method and apparatus of the present invention provides improved correction not only for large standoffs, but also for small standoffs. For this purpose, long space detector 12, short space detector 14, and source 16 are preferably linearly positioned within tool 10 and along a line parallel with tool axis 34, which axis is normally substantially parallel with a longitudinal axis of borehole 21. Gamma rays leave source 16, scatter through formation 19, and some gamma rays scatter back to the tool 10 and are detected by detectors 12 and 14. The intensity of the radiation falls with increasing distance from the source. Thus, the flux available at the long space detector 12 is less than that available at short space detector 14. However, because of the greater distance from source 16, the gamma rays detected at the long space detector 12 have a higher probability of having been scattered more deeply in the formation. Those gamma rays detected by the short space detector 14 are thus less likely to have traveled far from tool 10, and more sensitive to the environment near tool 10 since those gamma rays on the average are scattered a fewer number of times than the gamma rays detected by the long space detector. For these reasons, the long space detector 12 of the present invention is preferably taken to be the primary density measurement, with a perturbative correction for borehole environment being generated by the short space detector 14. The spine and rib plots, such as shown in FIG. 8 and FIG. 9, thus characterize the response of the tool 10 in the presence of intervening material, such as borehole fluid.

Although the diameter of the sensitive portions of the MWD density tool 10 may correspond with the "gauge" diameter of the drilling bit, and although logging with tool 10 may occur soon after borehole 21 is drilled, some hole enlargement will almost always have occurred by the time of logging. This variance may be due to "wallowing" of the bit in the hole, because of a rotary drilling behind a "bent sub", or because of washing out of the hole behind the bit with the flow of drilling fluid. Under the method and apparatus of the present invention, the correction derived for the spine and rib plot is optimized by increasing the sensitivity of long space detector 12 to the formation, while at the same time increasing the sensitivity of short space detector 14 to the environment near tool 10 i.e., the borehole 21. For this purpose, the long space detector 12 is positioned as far from the source as possible without offsetting gains derived from sensitizing the long space detector 12 with increased statistical measurement error due to decreasing count rates. The actual point at which this occurs is a function of, among other things, the source strength and the time available to acquire a sample.

For both the far and the near detectors 12 and 14, respectively, the gamma rays pass through collimators 18 and 20 within the stabilizer blade 11 of tool 10. Ideally, these collimators are filled at least substantially with a low density material, which has a low atomic number and is effectively transparent to gamma rays compared to the tool material surrounding the collimators, such as shield 28, bore shield 30 surrounding bore 38, and exterior surface sleeve 36. For maximizing count rates at the detectors, the collimator 18 for long space detector 12 preferably has a cross-section approximating the cross-sectional area of the detector 12, as shown in FIG. 3, and preferably has a longitudinal axis substantially parallel with respect to tool axis 34. As a consequence, gamma rays which enter long space detector 12 do so at an angle that is more nearly normal to axis 34 than parallel to it. As previously noted, gamma rays detected at long space detector 12 have typically scattered in the formation a number of times. Because of the orientation of collimator 18 and the axial distance between the long space detector 12 and the source 16, each of the gamma rays detected in the far detector has a fairly high probability of having experienced most of its scattering in the formation 19.

Sensitivity of short space detector 14 to the borehole environment is increased by decreasing the axial distance between this detector and source 16. However, the mechanical strength and shielding requirements place a practical limit on the distance between the short space detector 14 and the source 16. A radially outwardly directed collimator for the short space detector 14 produces a usable rib from which corrections may be made, as shown in FIG. 8 by the radial window rib 72. A more sensitive detection scheme, as provided by the apparatus of the present invention as discussed hereafter, would have a rib such as that labeled as wedge window 70 in FIG. 8. The greater the response difference between the short space detector 14 and the long space detector 12, the greater the correction accuracy, at least for relatively short standoffs. In other words, according to the method and apparatus of the present invention, the degree to which the detectors respond differently as a function of standoff is increased. The correction value is thus a function of the difference between these two readings, and for a sufficiently small difference, the measurement errors in the two detectors become more critical to determining an accurate correction value. For this purpose, the present invention provides a relatively large response difference to provide more accurate correction, at least for relatively small standoffs. Compare FIG. 8 and FIG. 10. The method of the present invention, as discussed hereinbefore, effectively extends this accuracy from smaller standoffs to larger standoffs.

Scattering of gamma rays occurs in a random manner in the formation and the borehole. Of the gamma rays detected, some scatter in the environment once, others twice, others three times, and so on. The likelihood of detecting a gamma ray that has scattered only once or twice decreases with increasing distance from the source. Long space detector 12 is at such a distance that most of its detected gamma rays have been scattered several times.

Narrowly collimating gamma ray source 16 and short space detector 14 is illustrated by collimators 20*a* and 24*a*, as shown in FIG. 2. For the sake of illustrating the principle, even these relatively narrow collimators could be imagined as being more narrow. As well, source collimator 24*a* and short space detector 20*a* are oriented at angles lower than normal, i.e., with an acute angle orientation with respect to tool axis 34. Such orientation, assuming surrounding tool material 38 is perfectly opaque to the passage of gamma rays, substantially allows only detection of gamma rays that go into the borehole locus 40 therebetween and return to short space detector 14. Multiple scatterings are possible, but the probability of exiting source collimator 24*a*, and entering short space collimator 20*a* in the direction which will allow passage through to detector 14, after multiple scatterings, is negligibly small compared to the probability of doing so after one scattering. Thus, the narrow collimators allow only singly scattered gamma rays to be detected and, possibly more importantly, define the location of the scattering event.

The scattering position of the detected gamma ray may be brought closer to tool 10 by lowering the angle of the narrow collimators, and moved further away by raising the angle. In fact, for a radially oriented collimator, the single scattering location is extremely far way from the tool. For sufficiently narrow radial collimation, the single scattering location may be so far away that the probability of a singly scattered gamma ray being detected is practically negligible. For practical purposes, the detection would more likely be of those gamma rays which have scattered more than once and managed to enter the detector by a more tortuous although shorter length route.

The region of investigation in the general area of locus 40 may be broadened by widening the collimation in a plane, as shown in FIG. 3, defined by the tool central axis 34 and passing through source 16 and detectors 12 and 14, so that the profile of the short space collimator 20 and/or source collimator 24 is wedge shaped. As shown, the longitudinal length of the collimator 20 increases with increasing radial distance. Thus, the region from which gamma rays may scatter once and then be detected is broadened. To generalize the single scattering principle, the sensitive depth of the detector is increased when the collimator opening is extended more towards a direction normal to tool axis 34. To extend the region more in the direction of tool 10, the collimator must be oriented at shallower angles. An acute angle for wall 44 of collimator 20 with respect to the tool longitudinal axis 34 prevents radially travelling gamma rays from reaching short space detector 14. The increased acute angle of wall 42 of collimator 20 increases the count rates emitted from source 16 and detected by short space detector 14.

In a preferred embodiment, it is desirable to relax collimation of source 16 to have a wedge shape cross-section as shown in FIG. 3. A narrow collimator opening for source 16 unnecessarily restricts the range of gamma rays for single scattering events. Independent of the concerns for the short space detector 14, it is generally desirable to not restrict source collimator 24 unduly in order to maximize the count rate in the more distant far detector 12.

The physics of gamma ray scattering from electrons is, however, more complex in that scattering in certain directions is preferred. Scattering in the forward directions, or at angles that represent small deviations from the original trajectory of the gamma ray, are more probable than scattering at most higher angles representing larger deviations from the original trajectory of the gamma ray. More specifically, those gamma rays that are scattered at a low angle, that is, an angle such that the gamma ray path is more parallel to tool axis 34, tend to enter short space collimator 20 through that portion of collimator 20 that is most angled from the radial direction, i.e. in the locus of wall 42. Those gamma rays that are scattered at a higher angle tend to enter collimator 20 through that portion of the collimator that is least angled from the radial direction, i.e. in the locus of wall 44. Accordingly, as the collimator is opened to progressively increased angles with respect to the normal, the number of detected events from low angle trajectories increases disproportionately. On the other hand, extending the "wedge" shape of collimator 20 in the plane shown in FIG. 3, to low angles with respect to the normal does not increase the number of events proportionately because the probability of scattering through such larger angles is decreased.

It may be desirable, under some circumstances, to change this sensitivity by changing the relative numbers of low scattered gamma rays to those scattered at higher angles. This may be done in several ways. For instance, the angle of wall 42 with respect to a radial direction may be decreased, thereby blocking out those gamma rays scattered at the lowest angles. However, this method would reduce the sensitivity to small standoffs.

Figure 4:
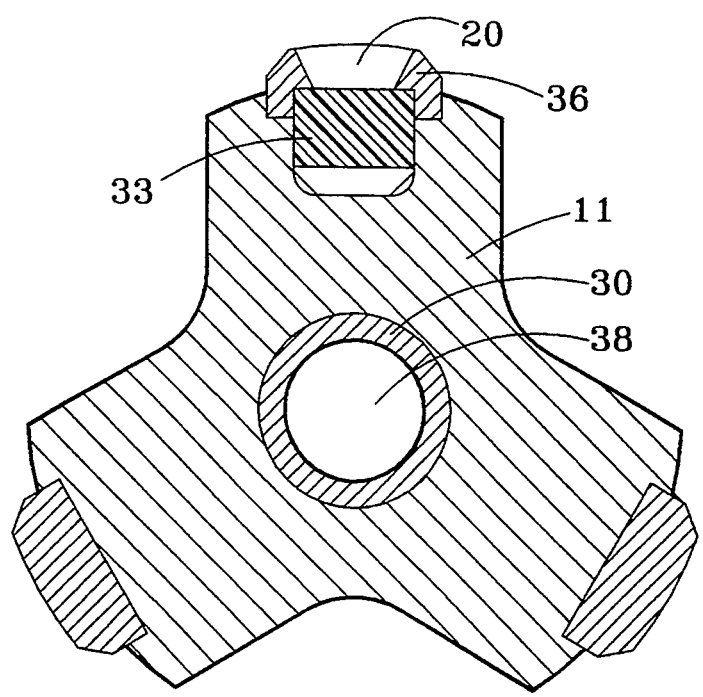
FIG. 4 is a cross-sectional view taken along lines 4—4 of FIG. 3.
Figure 5:
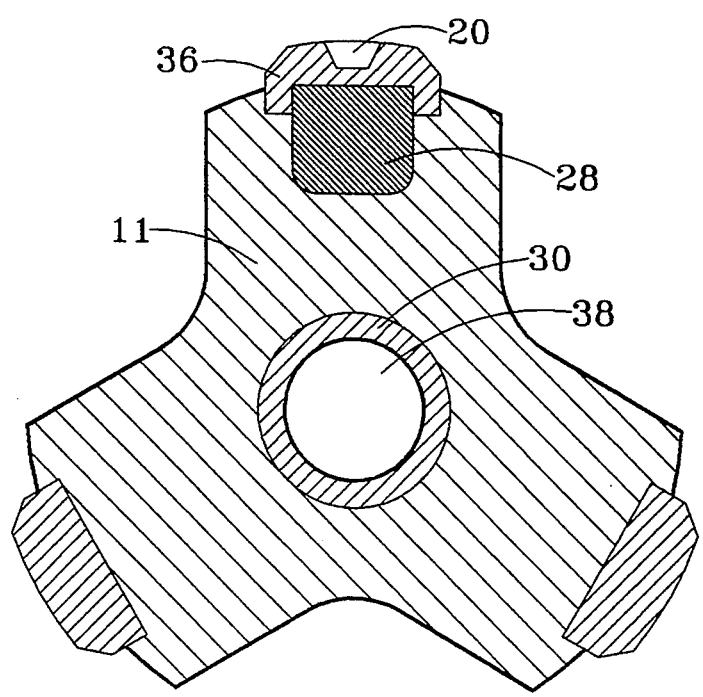
FIG. 5 is a cross-sectional view taken along lines 5—5 of FIG. 3.

A preferred method involves widening the collimator 20 in the azimuthal direction, i.e., in a direction within a cross-sectional plane orthogonal to tool axis 34, as one moves further from the source. This allows acceptance of more gamma rays which have scattered through a larger angle. FIG. 1 illustrates the general configuration short space collimator 20, and FIG. 4 and more clearly depicts the cross-sectional configuration of the short space collimator 20. The wedge shape of the short space collimator 20 should ideally constrict as the wedge nears detector 14. In a plane through collimator 20 and orthogonal to tool axis 34, side 44 of the collimator is wider than side 42, as shown in FIG. 1. Such a shape will, at least partially, compensate for the loss of intensity of gamma ray flux at higher scattering angles, since this collimator configuration will accept a greater flux of gamma rays scattered more deeply.

This modification allows collimation acceptance and detection of gamma rays scattered at higher angles, but keeps the number of small angle scattered gamma rays essentially constant. This then increases the relative fraction of more deeply scattered gamma rays. The deeper sensitivity would be reflected ultimately in the shape of the rib, such as rib 70. Such modification provides greater control over the volume of space outside of tool 10 to which tool 10 is sensitive, just as the generally wedge shape of collimator 14 does, as discussed hereinbefore.

Various shapes of collimator 20 may be used for this purpose whereby azimuthal width of the collimator is increased with distance from the source. For instance, collimator 20 may be very narrow for most of its length beginning at end 42 nearest source 16, and finally at the opposite end, flare out suddenly and considerably.

Another related consideration is the azimuthal acceptance angle of the collimators. The derivation of correction data for tool standoff is usually based on the characterization of tool response in a controlled situation. A difference between tool calibration for different standoffs in a ten inch laboratory borehole may thus produce a different response in a borehole enlarged to eleven inches due to the difference in borehole curvature. The response could also be affected by the tool orientation in the borehole.

To minimize this effect on the short space detector 14, the collimation of the near detector should preferably be narrow in the azimuthal direction, which will minimize the effect, in the azimuthal dimension, of any sensed annular material. However, there are at least two ways to "narrow" the collimation or restrict a "beam" of detected gamma rays. One method, as discussed, is to reduce the collimator azimuthal width. Another method for effectively narrowing the collimator is to lengthen the gamma ray path through the collimator. For instance, in the presently preferred embodiment of an approximately 24 cm diameter tool (8.5 inches), the short space collimator 20 is tilted at an angle of approximately 45° relative to the longitudinal tool axis 34. This tilt lengthens the path of the collimator from approximately 2.5 cm or one inch (had the collimator centerline been normal or 90° to the longitudinal tool axis 34), to approximately 3.75 cm or one and one half inches. Accordingly, the collimator is lengthened by about 50%. Preferably the azimuthal width of the collimator for this length is about 0.6 cm (one-quarter inch) for a large portion of the collimator, so that the azimuthal width averages about this amount. Thus, a preferred ratio of length to average width may be in the range of at about 6:1 or greater. Increasing this ratio may result in further improvement in the response as discussed in more detail hereinafter. Depending on the size tool, hole size, width of the collimator, and other factors, a different minimum ratio may be developed.

Preferably, in an approximately 8.5 inch (24 cm) diameter tool 10, the ratio of the diameter of the tool to the azimuthal width, or to the average azimuthal width, will be less than about 4%. In a preferred embodiment, the majority of the azimuthal width of the collimator for this diameter tool will preferably be about 0.25 inches (0.6 cm) such that the ratio is about 2.9%. If tool 10 is not perfectly round, then the diameter referred to is the diameter of a circle circumscribed about the outer edges of tool 10.

This narrowing of collimator 20 conflicts to some extent with the concept of widening the wedge of collimator 20, as discussed, to accept a greater number of gamma rays scattered from high angles, but this concept is substantially accommodated by the average azimuthal width restriction in the short space collimator 20 and the preferred tilt of the short space collimator in the direction of the detector 14, as shown in FIGS. 1 and 3, and certainly applies to a significant portion of short space collimator 20.

The azimuthal acceptance angle and collimator length become a significant correction factor for measurement errors caused by rotation of the tool as compared to a wireline tool which does not rotate. The measurement errors caused by rotation may be demonstrated in the exercise of a typical tool calibration.

A "static" rib, as we shall designate the rib for a typical tool calibration, may be determined by tool 10 response as the tool is moved away from a borehole wall in a direction such that the plane containing the tool axis, source, and detector is normal to the borehole wall, i.e., as the tool is moved in the direction of a hole diameter. In this situation, the standoff, such as gap 32, seen by the short space collimator is effectively symmetric about a plane defined by tool axis 34 and the centers of the source and detectors.

In contrast, the standoff or gap 32, seen by the short space collimator in an oversize hole during rotation, will not normally be symmetric about a plane defined by tool axis 34 and the centers of the source and detectors. This is because the shape of the standoff of gap 32 (annulus) formed between tool 10 and borehole wall 23 is different from the static case. Specifically, the annulus will be thicker on one side of the plane than the other at all times except at the two occasions of symmetry during rotation which occur when the tool is at the minimum and maximum standoff distances. We can refer to a rib determined by simply rotating a tool eccentered in an oversize hole, as a "rotational rib".

The "static" and "rotational" ribs are not identical, i.e., the short space detector response to an offset from borehole wall 23 during eccentric rotation in an oversize borehole is different from short space detector response to offset in an oversize borehole where than is no rotation of the detector. This is believed to be due to the asymmetry of the annular material seen by short space detector 14, and to the non-linearity of the interaction between the gamma rays and the material involved. The latter complicates any consideration of gamma ray interactions in which more than one material is involved.

The way in which this adverse situation is preferably remedied, using the method and apparatus of the present invention, is by "narrowing" short space collimator 14. As discussed, such "narrowing" preferably includes restricting the azimuthal width of the collimator and/or increasing the length of the gamma ray path in the collimator. Effectively, these features restrict the width of the "beam" of gamma radiation entering the detector. Since the effects of the asymmetry are seen across the width intersected by the beam of detected gamma rays, the narrower the beam, the smaller will be the effects of asymmetry.

In other words, as the beam width is progressively decreased, the geometry of the tool and the formation more closely approximate the static, symmetrical situation in which the spine and rib characterization is normally made. Thus, the short space detector response to offset from the borehole wall during eccentric rotation becomes approximately equivalent to short space detector response to offsets from the borehole wall during non-rotation of the detector when the plane containing the source, detectors, and tool axis is normal to the borewall. This also corresponds to the situation during rotation when the offset is either at its maximum or at its minimum.

Figure 6:
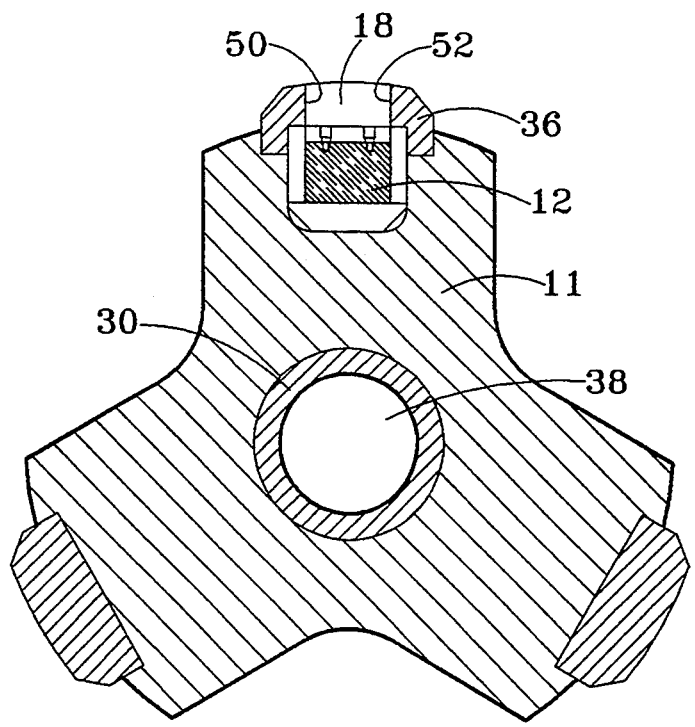
FIG. 6 is a cross-sectional view taken along lines 6—6 of FIG. 3.
Figure 7:
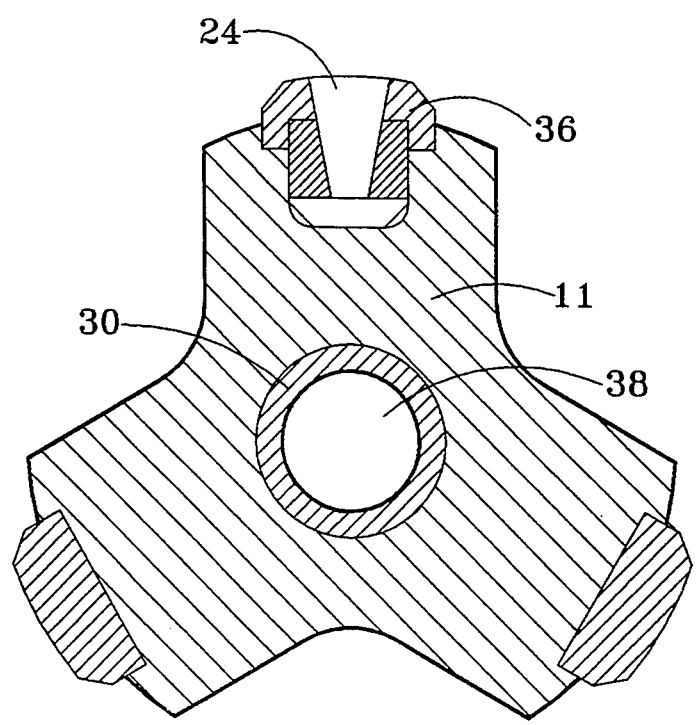
FIG. 7 is a cross-sectional view taken along lines 7—7 of FIG. 3.

For the long space detector 12, it is desirable to maintain the radially oriented walls 46 and 48 of collimator 18 each preferably normal to the longitudinal tool axis 34 to promote gamma ray receipt from formation 18 from a radial direction with respect to tool 10, although they could also be somewhat wedgeshaped to enhance receipt of gamma ray flux from the formation. Collimator 18 is preferably not angled with respect to the radial direction to maximize gamma ray flux from the formation. Sides 50 and 52 of the collimator as shown in FIG. 6 may be normally oriented, or may be wedge-shaped in a manner similar to the walls of the short space collimator 20. Due to the increased spacing between the detector 12 and the source 16, the effect of decreased count rates from high angle gamma ray scattering is less pronounced, and correction is preferably not made. However, in order to increase the gamma flux received by the long space detector 12 as the gamma flux is decreased as discussed hereinbefore, it is necessary that the average long space collimator azimuthal width, defined by sides 50 and 52, be at least three times the short space azimuthal width.

Borehole liner 30 is preferably a cylindrical sleeve and surrounds bore 38 which passes through tool 10 for transmitting drilling fluid. Borehole liner 30 prevents or blocks radiation from traveling from source 16 to bore 38, through the drilling fluid 26, and to either the long space or the short space detectors 12 and 14, respectively. Borehole liner 30 thus preferably extends along the longitudinal length of at least that portion of the tool 10 which includes the source and the detectors.

While the collimators disclosed have substantially flat walls, the walls may also be rounded, oval, elliptical, and so forth, and still have substantially the same or equivalent dimensions in line with the principles discussed. The foregoing disclosure and description of the invention is illustrative and explanatory thereof, and it will be appreciated by those skilled in the art, that various changes in the size, shape and materials as well as in the details of the illustrated construction or combinations of features of the various elements may be made without departing from the spirit of the invention.

What is claimed is:

1. A method for determining at least one characteristic of an earth formation having a borehole therein, said borehole having a longitudinal axis, said method comprising the steps of:

positioning a first directional radiation sensor in said borehole adjacent said earth formation for detecting counts indicative of radiation from said earth formation;

rotating said first directional radiation sensor at a substantially fixed rotational speed having a single rotation time period;

storing counts detected by said first directional radiation sensor during a total sample period, said total sample period being longer than two times said single rotation time period, said step of storing detected counts including storing counts detected during a plurality of short duration time periods each within said total sample period, each of said short duration time periods being shorter than one-half said single rotation time period;

defining a plurality of bins as a function of at least a portion of a count rate distribution of said counts detected during each of said short duration time periods; and sorting counts detected during each of said short duration time periods into one of said plurality of bins for providing an indication representative of said at least one characteristic of said earth formation.

2. The method of claim 1, wherein said step of defining a plurality of bins further comprises:
   determining a count rate mean of said counts detected during each of said short duration time periods; and
   defining said plurality of bins as a function of said determined count rate mean.

3. The method of claim 2, further comprising:
   determining a theoretical standard deviation of said count rate mean and a measured standard deviation of said count rate mean; and
   comparing said theoretical standard deviation and said measured standard deviation to generate a borehole size indicator signal.

4. The method of claim 3, further comprising:
   correcting stored counts in response to said borehole size indicator signal.

5. The method of claim 2, further comprising:
   positioning a second directional radiation sensor in said borehole axially spaced from said first directional sensor; and
   positioning a radiation source in said borehole axially spaced from each of said first and second directional radiation sensors.

6. The method of claim 5, wherein said step of storing counts further comprises:
   passing counts for detection by each of said first and second directional radiation sensors during each of said short duration time periods which are substantially related to energy levels associated with Compton scattering of gamma rays; and
   passing counts for detection by at least one of said first and second directional radiation sensors during each of said short duration time periods which are substantially related to energy levels associated with photoelectric absorption of gamma rays.

7. The method of claim 5, further comprising:
   positioning said second directional radiation sensor at a greater axial distance from said radiation source than said first directional radiation sensor; and
   blocking radiation received by said first directional radiation sensor from said formation in a direction substantially normal to said longitudinal axis of said bore hole.

8. The method of claim 5, further comprising:
   passing radiation received by said second directional radiation sensor from said formation in a direction substantially normal to said longitudinal axis of said borehole.

9. The method of claim 5, further comprising:
   positioning said first radiation sensor a selected distance from said radiation source for receiving substantially only single scattered gamma rays from said radiation source.

10. The method of claim 5, wherein said step of storing counts further comprises:
    storing counts detected by said second directional radiation sensor during said plurality of short duration time periods; and
    adding counts detected by said first and second directional sensors during said plurality of short duration time periods.

11. The method of claim 10, wherein said step of determining said count rate mean further comprises:
    averaging counts from said first and second directional radiation sensors.

12. The method of claim 10, wherein said step of sorting counts further comprises:
    sorting counts detected during said short duration time periods by said first and second radiation sensors into one of two or more bins each defined as a function of said determined count rate mean.

13. The method of claim 12, further comprising:
    weighting counts stored in one of said at least two or more bins for providing said indication representative of said at least one characteristic of said earth formation.

14. Apparatus for investigating properties of earth formations surrounding a borehole, including a radiation source, a short space detector, and a long space detector each positioned within a body having a longitudinal axis, said apparatus further comprising:
    a short space detector collimator disposed within said body at a first position spaced from said radiation source, said short space detector collimator defining a volume containing material substantially transparent to radiation, said short space detector collimator having a short space cross-section defined by a plane parallel to and including said longitudinal axis, a far side of said short space cross-section spaced from said radiation source forming a first acute angle with respect to said longitudinal axis to substantially block radiation received by said short space detector in a direction substantially normal to said longitudinal axis, said short space cross-section having a longitudinal length in a direction substantially parallel to said longitudinal axis, said longitudinal length increasing with increased spacing from said longitudinal axis in a radially outward direction; and
    a long space detector collimator disposed within said body at a second position spaced from said radiation source, said long space detector collimator defining a volume containing material substantially transparent to radiation, said long space detector collimator having a wall extending outwardly from said long space detector to pass radiation to said long space detector in a direction substantially normal to said longitudinal axis.

15. The apparatus of claim 14, further comprising:
    a near side of said short space cross-section spaced between said radiation source and said far side forming a second acute angle with respect to said longitudinal axis which is more acute than said first acute angle.

16. The apparatus of claim 14, further comprising:
    said short space detector collimator having another cross-section defined by another plane parallel to and spaced from said longitudinal axis, said another cross-section having a width in a direction normal to said longitudinal axis which increases with increased spacing from said radiation source; and
    said long space detector collimator having a substantially rectangular cross-sectional configuration within said another plane.

17. The apparatus of claim 14, further comprising:
    said body being substantially tubular and including a radially outwardly extending blade, said short space detector collimator and said long space detector collimator each extending through a portion of said radially outwardly extending blade.

18. The apparatus of claim 14, further comprising:
    said long space detector collimator having a substantially constant width with varying spacing radially outwardly from said longitudinal axis; and said short space collimator having a selected axial spacing from said radiation source for receiving substantially only singly scattered gamma rays from said radiation source.

19. The apparatus of claim 14, further comprising:
a source collimator formed of a low density material and disposed within said body, said source collimator having a cross-section defined by said plane parallel to and including said longitudinal tool axis, said cross-section having an area which increases radially outwardly from said longitudinal axis.

20. A method for correcting measurements for determining at least one characteristic of an earth formation having a borehole therein, said method comprising the steps of:
positioning a first directional radiation sensor in said borehole adjacent said earth formation for detecting counts indicative of radiation from said earth formation;
rotating said first directional radiation sensor at a substantially fixed rotational speed having a single rotation time period;
detecting counts with said first directional radiation sensor during a total sample period, said total sample period being longer than two times said single rotation time period, said step of detecting counts including detecting counts with said first directional radiation sensor during a plurality of short duration time periods each within said total sample period, each of said short duration time periods being shorter than one-half said single rotation time period;
determining a measured count rate standard deviation of a count rate distribution of said counts detected during the plurality of short duration time periods;
comparing said measured rate count standard deviation with a calculated count rate standard deviation; and
producing an irregular borehole flag signal when said measured rate count standard deviation differs from said calculated count rate standard deviation by a maximum amount.

21. The method of claim 20, further comprising:
providing a correction to said detected counts in response to said irregular flag signal.

22. The method of claim 21, wherein said step of providing a correction responsive to said irregular flag signal further comprises:
sorting counts during each of said short duration time periods into one of a plurality bins each defined as a function of a count rate distribution for providing an indication representative of said at least one characteristic of said earth formation.

23. The method of claim 20, further comprising:
determining a borehole size in response to said step of comparing.

24. The method of claim 23, further comprising:
integrating over a length of the borehole to determine a borehole volume.

25. A method for correcting measurements for determining at least one characteristic of an earth formation having a borehole therein defined by a borewall, said method comprising the steps of:
positioning a source within said borehole for irradiating said borehole and said earth formation with gamma rays;
positioning a first spaced radiation sensor in said borehole adjacent said earth formation for detecting counts indicative of radiation from said earth formation;
positioning a second spaced radiation sensor in said borehole at a distance further from said source than said first spaced radiation sensor;
positioning a tool housing within said borehole to provide a support for said source, said first spaced radiation sensor, and said second spaced radiation sensor, said tool housing having a tool diameter related to a circle circumscribed about said tool housing;
forming a first collimator configured for passing a portion of said gamma rays into said first spaced radiation sensor such that an azimuthal width of a portion of said collimator is less than approximately 4% of said tool diameter of said tool housing;
rotating said source and said first and second spaced radiation sensors; and
detecting gamma rays with said first spaced radiation sensor around at least a substantial portion of a circumference of said borehole during said step of rotating.

26. The method of claim 25, further comprising the step of:
forming a second collimator for said second spaced radiation sensor having a azimuthal width greater than said azimuthal width of said portion of said first collimator.

27. The method of claim 26, wherein:
said first collimator has an azimuthal width which varies along its longitudinal length to produce an average azimuthal width, said average azimuthal width of said first collimator being less than said azimuthal width of said second collimator.

28. The method of claim 25, further comprising the step of
adjusting said azimuthal width of said portion of said collimator until a rotational and a non-rotational response of said first spaced radiation sensor to offset from said borewall are substantially equalized.

29. A method for correcting measurements for determining at least one characteristic of an earth formation having a borehole therein defined by a borewall, said method comprising the steps of:
positioning a source within said borehole for irradiating said borehole and said earth formation with gamma rays;
positioning a first spaced radiation sensor in said borehole adjacent said earth formation for detecting counts indicative of radiation from said earth formation;
positioning a second spaced radiation sensor in said borehole at a distance further from said source than said first spaced radiation sensor;
forming a first collimator configured for passing a portion of said gamma rays to said first spaced radiation sensor, said first collimator having a portion with a first azimuthal width; and
forming a second collimator configured for passing a portion of said gamma rays to said second spaced radiation sensor, said second collimator having a portion with a second azimuthal width greater than at least three times said first azimuthal width.

30. The method of claim 29, further comprising:
positioning a tool housing within said borehole to provide a support for said source, said first spaced radiation sensor, and said second spaced radiation sensor, said tool housing having a tool diameter related to a circle circumscribed about said tool housing;

forming said first collimator such that an azimuthal width of a portion of said collimator is less than approximately 4% of said tool diameter of said tool housing;

rotating said source and said first and second spaced radiation sensors; and detecting gamma rays with said first spaced radiation sensor around at least a substantial portion of a circumference of said borehole during said step of rotating.

31. The method of claim 29, further comprising:
tilting said first collimator with respect to a radial line perpendicular to said first spaced radiation sensor, said first collimator having an axial length; and
providing said first azimuthal width such that a ratio of said axial length to said first azimuthal width is greater than approximately six.

32. Apparatus for investigating properties of earth formations surrounding a borehole, including a radiation source, a short space detector, and a long space detector each positioned within a body having a longitudinal axis, said apparatus further comprising:
said body including a central bore therethrough for passing drilling fluid;
a sleeve surrounding said central bore, said sleeve consisting of a high density material and radially spaced between said source and said central bore for preventing radiation from said source from contacting said drilling fluid within said central bore;
a short space detector collimator disposed within said body at a first position spaced from said radiation source, said short space detector collimator defining a volume containing material substantially transparent to radiation, said short space detector collimator having a short space cross-section defined by a plane parallel to and including said longitudinal axis; and
a long space detector collimator disposed within said body at a second position spaced from said radiation source, said long space detector collimator defining a volume containing material substantially transparent to radiation.

33. The apparatus of claim 32, further comprising:
said sleeve extends longitudinally from said radiation source to said long space detector.

34. The apparatus of claim 32, further comprising:
a source collimator formed of a low density material and disposed within said body, said source collimator having a cross-section defined by said plane parallel to and including said longitudinal tool axis, said cross-section having an area which increases radially outwardly from said longitudinal axis.

35. A method for determining at least one characteristic of an earth formation having a borehole therein, said borehole having a longitudinal axis, said method comprising the steps of:
positioning a radiation source in said borehole;
positioning a first directional radiation sensor in said borehole at a position spaced from said radiation source;
positioning a second directional radiation sensor in said borehole opposite said radiation source with respect to said first directional radiation sensor;

rotating said first and second directional radiation sensors and said radiation source at a rotational speed having a single rotation time period;
detecting counts with said first and second directional radiation sensors during a sample period including a plurality of short duration time periods; and
sorting counts detected during each of said plurality of short duration time periods into one of a plurality of bins for providing an indication representative of said at least one characteristic of said earth formation.

36. The method of claim 35, further comprising:
combining counts detected during said plurality of short duration time periods by said first directional radiation sensor and by said second directional radiation sensor.

37. The method of claim 36, further comprising:
averaging counts from said first and second directional radiation sensors.

38. The method of claim 35, wherein said step of sorting counts further comprises:
determining a count rate mean for said counts detected during said sample period; and
defining each of said plurality of bins as a function of said determined count rate mean.

39. The method of claim 35, further comprising:
weighting counts stored in one of said plurality of bins for providing said indication representative of said at least one characteristic of said earth formation.

40. The method of claim 35, wherein said step of sorting counts further comprises:
passing counts for storage detected by each of said first and second directional radiation sensors during each of said short duration time periods which are substantially related to energy levels associated with Compton scattering of gamma rays; and
passing counts for storage detected by at least one of said first and second directional radiation sensors during each of said short duration time periods which are substantially related to energy levels associated with photoelectric absorption of gamma rays.

41. The method of claim 35, further comprising:
the step of sorting counts detected includes positioning an acoustic caliper in said borehole to determine a standoff; and
determining a length of said sample period during said step of sorting counts detected.

42. A method for determining at least one characteristic of an earth formation having a borehole therein, said borehole having a longitudinal axis, said method comprising the steps of:
positioning a radiation source in said borehole;
positioning a first directional radiation sensor in said borehole at a position spaced from said radiation source;
positioning a second directional radiation sensor in said borehole opposite said radiation source with respect to said first directional radiation sensor;
positioning a receiver in said borehole adjacent said first and second directional radiation sensors for generating a signal indicative of a standoff distance;
correlating said signal with counts from said first and second directional radiation sensors detected during a plurality of short duration time periods while rotating said receiver and said first and second directional radiation sensors; and sorting counts detected by said first and second directional radiation sensors during each of the plurality of short duration time periods into a plurality of bins each functionally related to said signal.

43. The method of claim 42, further comprising:
the step of positioning a receiver includes positioning an acoustic transmitter-receiver in said borehole adjacent said first and second directional radiation sensors for generating an acoustic signal indicative of said standoff;

correlating said acoustic signal with counts from said first and second directional radiation sensors detected during a plurality of short duration time periods while rotating said acoustic receiver and said first and second directional radiation sensors; and determining a formation density in response to the counts from said first and second directional radiation sensors and said acoustic signal.

* * * * *